United States Patent Office 3,528,957
Patented Sept. 15, 1970

1

3,528,957
METHOD OF PRODUCING POLYBUTADIENE
Morford C. Throckmorton, and William M. Saltman, Akron, Ohio, assignors to The Goodyear Tire & Rubber Company, Akron, Ohio, a corporation of Ohio
No Drawing. Filed July 10, 1967, Ser. No. 651,991
Int. Cl. C08d 3/06
U.S. Cl. 260—94.3    10 Claims

ABSTRACT OF THE DISCLOSURE

A method and a catalyst system for the solution polymerization of butadiene or butadiene in mixture with other diolefins to form polymers containing a high content of cis-1,4 addition is described. The solution polymerization is carried out under conventional polymerization conditions. The catalyst employed is a mixture of (1) organometallic compounds of metals of Groups I, II and III; (2) at least one compound selected from the class consisting of organonickel and organocobalt compounds, and (3) at least one boron trifluoride complex prepared by complexing boron trifluoride with a member of the class consisting of monohydric alcohols, phenols, water and mineral acids containing oxygen.

---

This invention is directed to methods of polymerizing butadiene and butadiene in mixture with other diolefins to form polymers having a high content of cis-1,4 addition. It is also directed to catalyst systems useful for this purpose.

Polymers of butadiene or butadiene in mixture with other diolefins containing a high proportion of the butadiene units in the cis-1,4 configuration possess properties which make them useful as synthetic rubbers.

It is an object of this invention to provide a method whereby butadiene can be polymerized to a high content of cis-1,4 polybutadiene. Another object is to provide a catalyst system by which these polymerizations may be accomplished. Another object is to form copolymers of isoprene or other diolefins and butadiene in which the polybutadiene segment has a high content of cis-1,4 structure. Another object is to produce high cis-1,4 polybutadiene with excellent processing properties. Other objects will become apparent as the description proceeds.

The term "good processability" describes a polymer which before and after compounding manifests properties ideal for use on rubber processing equipment. These desirable porperties lead to ready banding on mix mills, good tack, and ease of extrudability.

It is still obscure which chemical and physical parameters of a polymer contribute to the properties associated with good processability. It is hypothesized that a given molecular weight distribution of the polymer influences the processing properties of the polymer to a greater degree than a high cis-1,4 molecular orientation.

For example, polybutadiene made by a process, using a two component catalyst system consisting of trialkyl aluminum and titanium tetraiodide, has a cis-1,4 molecular configuration in the neighborhood of 90 to 94% of the polymer structure formed. However, as a general rule, the polybutadiene produced by this process does not possess the ultimate in processability properties, and often requires blending with other elastomers to attain the desired degree of processability with standard rubber mixing and forming machinery. In spite of its relatively high cis-1,4 content, the polybutadiene produced by this process is, on the average, no better or no worse in processing properties than polybutadiene made with the alkyl-lithium catalyst system which produces a polybutadiene with about a 40% cis-1,4 structure. Polybutadiene made with the two component catalyst system comprising alkylaluminum halides and cobalt salts results in molecular structures very high in cis-1,4 configuration (in the neighborhood of 98%), yet these polymers do not show appreciable processing advantage over the polybutadiene type polymers made by either of the other two processes previously mentioned.

Based on the most practical test of what indicates good polymer processability, that is, manifestations during actual factory processing, polybutadiene produced by a ternary catalyst system comprising (1) triethylaluminum, (2) an organonickel salt, and (3) boron trifluoride·diethyl ether complex, which possesses a very high cis-1,4 molecular structure of about 98%, shows an appreciable gain in processability over the polybutadienes prepared in the aforementioned process.

The present invention also employs a ternary catalyst system similar to the just mentioned except that one catalyst component comprises boron trifluoride complexed with at least one member from the group comprising a monohydric alcohol, a phenol, water and an oxygen-containing mineral acid, the result of which, produces an unexpected increase in the polymerization reaction rate of 2 to 3 times greater than that achieved by the just-mentioned catalyst system. The processability of the polymer produced by the system of the present invention is equivalent to that produced by the system using boron trifluoride·diethyl ether complex.

In addition to promoting unexpected reaction rates, the catalyst system of the present invention has also shown an unexpected versatility in performance.

For example, the catalyst system just mentioned using the boron trifluoride·diethyl ether complex appears to be quite limited with respect to the selection of the trialkylaluminum component if optimum reaction rates for this system are to be attained. To maintain the optimum reaction rate with this catalyst system, the choice of trialkylaluminum compound appears o be limited to triethylaluminum. When the ethyl group in the trialkylaluminum compounds is replaced with longer chain alkyl groups, for example, n-propyl or isobutyl, not only is the polymerization reaction rate of this system appreciably reduced, but the molecular weight of the resulting polymer decreases below desirable values. The decline in reaction rate and polymer properties is particularly sharp when the triethylaluminum is replaced with diisobutyl aluminum hydride, triisobutylaluminum and/or organoaluminum compounds containing even longer chain alkyl group than the butyl group.

In contrast, the catalyst system of the present invention, using as one catalyst component, boron trifluoride complexed with at least one member from the group comprising a monohydric alcohol, a phenol, water and an oxygen-containing mineral acid, is much more versatile than the aforementioned system with respect to the selection of the trialkylaluminum compound. Various trialkylaluminum or dialkylaluminum hydrides (as indicated by the specific embodiments herein) can be used in the catalyst system of this invention without affecting the rapid polymerization, the high yield, or the desirable polymer viscosities characteristic of the system.

Thus, according to the invention, butadiene or butadiene in combination with other diolefins is polymerized by contact under solution polymerization conditions with a catalyst comprising (1) at least one organometallic compound in which the metal is selected from Groups I, II and III of the Periodic System, (2) at least one organometallic compound selected from the class consisting of organonickel and organocobalt compounds, and (3) at least one boron trifluoride complex prepared by complexing boron trifluoride with a member of the class consisting of monohydric alcohols, phenols, water and mineral acids containing oxygen.

The organometallic compounds wherein the metals are selected from Groups I, II and III of the Periodic System are organocompounds of such metals as lithium, sodium, potassium, rubidium, cesium, magnesium, calcium, strontium, beryllium, barium, zinc, cadmium, aluminum, gallium, and indium. The term "organometallic," as used here to refer to compounds, indicates that metals of Groups I, II and III of the Periodic System are attached directly to a carbon atom of alkyl, cycloalkyl, aryl, arylalkyl and alkaryl radicals. All of the above compounds may be used in the practice of this invention.

When considering the organometallic compounds containing metals from Groups I, II and III, it is preferred for this invention to use organoaluminum compounds, oragnomagnesium compounds, organozinc compounds and organolithium compounds.

By the term "organoaluminum compound" is meant any organoaluminum compound responding to the formula

in which $R_1$ is selected from the group consisting of alkyl (including cycloalkyl), aryl, alkaryl, arylalkyl, hydrogen and fluorine, $R_2$ and $R_3$ being selected from the group of alkyl (including cycloalkyl), aryl, alkaryl, alkoxy and arylalkyl. Representative of the compounds responding to the formula set forth above are: diethylaluminum fluoride, di-n-propylaluminum fluoride, di-n-butylaluminum fluoride, diisobutylaluminum fluoride, dihexylaluminum fluoride, dioctylaluminum fluoride, and diphenylaluminum fluoride. Also included are diethylaluminum hydride, di-n-propylaluminum hydride, di-n-butylaluminum hydride, diisobutylaluminum hydride, diphenylaluminum hydride, di-p-tolylaluminum hydride, dibenzylaluminum hydride, phenylethylaluminum hydride, phenyl-n-propylaluminum hydride, p-tolylethylaluminum hydride, p-tolyl-n-propylaluminum hydride, p-tolylisopropylaluminum hydride, benzylethylaluminum hydride, and other organoaluminum hydrides. Also included are diethylethoxyaluminum and dipropylethoxyaluminum. Also included are trimethylaluminum, triethylaluminum, tri-n-propylaluminum, triisopropylaluminum, tri-n-butylaluminum, triisobutylaluminum, tripentylaluminum, trihexylaluminum, tricyclohexylaluminum, trioctylaluminum, triphenylaluminum, tri-p-tolylaluminum, tribenzylaluminum, ethyldiphenylaluminum, ethyl-di-p-tolylaluminum, ethyldibenzylaluminum, diethylphenylaluminum, diethyl-p-tolylaluminum, diethylbenzylaluminum and other triorganoaluminum compounds.

By the term "organomagnesium compounds" is meant first any organomagnesium complex responding to the formula $R_aMgX_b$ where R may be alkyl, aryl, arylalkyl or alkaryl; X is a halogen, and $a$ and $b$ are mole fractions whose sum equals 2 while the ratio of $a/b$ is greater than 2 but is not infinite. Representative among the compounds responding to the formula set forth above are ethylmagnesium chloride complex, cyclohexylmagnesium bromide complex and phenylmagnesium chloride complex. Such compounds are usually prepared in the absence of ether.

Also "organomagnesium compounds" means any organomagnesium compound or any organomagnesium halide of the Grignard type corresponding to the formulas $R_2Mg$ or $RMgY$ where R may be alkyl, aryl, arylalkyl or alkaryl and Y is fluorine, or $R'R''Mg$ where $R'$ may be alkyl, aryl, or alkaryl and $R''$ may be either alkyl, aryl, arylalkyl or alkaryl. Representative among the compounds responding to these formulea are diethylmagnesium, dipropylmagnesium, ethylmagnesium fluoride and phenylmagnesium fluoride.

By the term "organozinc compound' 'is meant any organozinc compound responding to the formula $R_2Zn$ where R may be alkyl, aryl, alkaryl or arylalkyl. Representative among such compounds are diethylzinc, dibutylzinc or diphenylzinc.

By the term "organolithium compounds" is any organolithium compound responding to the formula R—Li where R is an alkyl, alkaryl, arylalkyl or aryl group. Representative among the compounds responding to the formula set forth above are ehtyllithium, propyllithium, n-, sec- or t-butyllithium, hexyllithium, styryllithium or phenyllithium. Also, the organolithiumaluminum compounds may be used. These compounds respond to the formula $R'R''_3LiAl$ where $R'$ and $R''$ may be alkyl, alkaryl or arylalkyl groups and $R'$ and $R''$ may or may not be the same group. Representative of these compounds are n-butyltriisobutyllithium aluminum, tetrabutyllithium aluminum, butyltriethyllithium aluminum and tetraisobutyllithium aluminum.

Representative of other organometallic compounds with metals selected from Groups I, II and III of the Periodic System are compounds containing at least one of the metals, sodium, potassium, calcium, beryllium, cadmium and mercury combined with at least one organic radical selected from the group consisting of alkyls, alkaryls, arylalkyls, and aryls.

The second component of the catalyst system of this invention is an organometallic compound which contains nickel and/or cobalt. The compound may be any organonickel compound or any organocobalt compound. It is preferred to employ soluble compounds of nickel and/or cobalt. These soluble compounds of nickel and/or cobalt are usually compounds of the said metals with a mono- or bi-dentate organic ligand containing up to 20 carbon atoms. "Ligand" is defined as an ion or molecule bound to and considered bonded to a metal atom or ion. Monodentate means having one position through which covalent or coordinate bonds with the metal may be formed; bi-dentate means having two positions through which covalent or coordinate bonds with the metal may be formed. By the term "soluble" is meant soluble in inert solvents. Thus, any nickel salt and/or cobalt salt of an organic acid, containing from about 1 to 20 carbon atoms may be employed.

Representative of such organonickel compounds are nickel benzoate, nickel acetate, nickel naphthenate, bis (alpha furyl dioxime)nickel, nickel octanoate, nickel palmitate, nickel stearate, nickel acetylacetonate, bis(salicylaldehyde) ethylene diimine nickel and nickel salicylaldehyde. Nickel tetracarbonyl also may be employed as the nickel containing catalyst in this invention. The preferred component containing nickel is a nickel salt of a carboxylic acid or an organic complex compound of nickel.

Representative of such organocobalt compounds are cobalt benzoate, cobalt acetate, cobalt naphthenate, bis (alpha furyl dioxime)cobalt, cobalt actonoate, cobalt palmitate, cobalt stearate, cobalt acetylacetonate, bis(salicylaldehyde ethylene diimine)cobalt and cobalt salicylaldehyde. Dicobalt octacarbonyl also may be employed as the cobalt containing catalyst in this invention. The preferred component containing cobalt is a cobalt salt of a carboxylic acid or an organic complex compound of cobalt.

The third component of the catalyst system is a boron trifluoride complex prepared by complexing boron trifluoride with a member of the class of monohydric alcohols, phenols, water and mineral acids containing oxygen. The BF₃ molecule has a strong tendency to accept electrons from donor molecules. Hence boron trifluoride complexes can be formed from a large number of electron donating compounds among which is the class consisting of monohydric alcohols, phenols, water and mineral acids containing oxygen. All members of the above class contain active hydrogen.

The monohydric alcohol sub-group of the above class of compounds can be symbolically portrayed as R—OH where R represents an alkyl, cycloalkyl, and an arylalkyl radical containing from 1 to 30 carbon atoms. Representative but not exhaustive of the alcohol group are methanol, ethanol, n-propanol, isopropanol, n-butanol, benzyl alcohol, and the like. The preferred complexes formed from the above group are as follows:

BF₃·methanol
BF₃·ethanol
BF₃·butanol

The phenol sub-group of the above class of compounds can be symbolically portrayed as φ—OH where φ represents a benzenoid group. Representative but not exhaustive of the phenol group are phenol, p-cresol, resorcinol, naphthol, hydroquinone and the like.

The preferred complexes formed from the above phenol sub-group are as follows:

BF₃·2 phenol
BF₃·p-cresol

BF₃·2 phenol is the most preferred complex formed from the phenol sub-group.

A number of the members in the sub-group of mineral acids containing oxygen will complex with BF₃. Representative but not exhaustive of the mineral acid sub-group are phosphoric acid, sulfuric acid, nitric acid and the like. The preferred complexes formed from the mineral acid sub-group are BF₃—100% phosphoric acid and BF₃—85% phosphoric acid with the first mentioned complex being preferred.

Water, although in a sub-group by itself, forms at least two hydrate complexes with BF₃. These are BF₃·H₂O and BF₃·2H₂O.

The various boron trifluoride complexes vary greatly in their shelf-life stability. Some, for example, BF₃·isopropanol are quite unstable in daylight at room temperature. Others, for example, BF₃·2 phenol are quite stable and possess a relatively long shelf-life at room temperature.

When not available commercially, many of the boron trifluoride complexes can be readily formed by directly contacting boron trifluoride gas (a colorless gas at ordinary temperatures and pressures, its boiling point being −101° C.), with the compound used as the complexing agent, that is, the electron donor compound. This contact is accomplished with a reacting apparatus combined with a sensitive weighing mechanism in order to achieve the desired mole ratios between the BF₃ and the electron donor compound. The reaction is carried out under an inert atmosphere. The reaction environment may consist only of the reacting components, BF₃ gas and the electron donor compound, or when convenient, the reaction may be carried out in the medium of an inert organic diluent. This last condition is usually necessary when the electron donor compound exists as a solid and must be put into solution or suspension to insure adequate contact with the BF₃ gas. Where the particular BF₃ complex, specified as a catalyst component, possesses an unstable shelf-life, it should be prepared as near to the time of polymerization as feasible.

The three component catalyst system of this invention has shown polymerization activity over a wide range of catalyst concentrations and catalyst ratios. Apparently, the three catalyst components interact to form the active catalyst. As a result, the optimum concentration for any one catalyst component is dependent upon the concentration of each of the other catalyst components. Although polymerization will occur over a wide range of catalyst concentrations and ratios, polymers having the most desirable properties are obtained over a narrower range. It has been found that polymerization will occur when the mole ratio of the organometallic compound in which the metal is selected from Groups I, II and III of the Periodic System (Me) to the organonickel compound (Ni) ranges from about 0.3/1 to about 500/1, and when the mole ratio of the boron trifluoride complex prepared by complexing boron trifluoride with a member of the class consisting of monohydric alcohols, phenols, water and mineral acids containing oxygen (BF₃·complex) to the organonickel compound (Ni) ranges from about 0.33/1 to about 300/1, and where the mole ratio of the organometallic compound of Groups I, II, III metals (Me) to the BF₃·complex ranges from about 0.1/1 to about 4/1.

The preferred Me/Ni mole ratio ranges from about 1/1 to about 150/1; the preferred BF₃·complex/Ni mole ratio ranges from about 1/1 to about 150/1; and the preferred Me/BF₃·complex mole ratio ranges from about 0.3/1 to about 1.4/1.

When organocobalt compounds replace organonickel compounds or mixtures of organonickel and organocobalt are used as the second catalyst component in the ternary system of this invention, the mole ratio of cobalt (Co) and/or nickel (Ni) to the other catalyst components are similar to those of nickel (Ni) shown above.

The three catalyst components may be charged to the polymerization system as separate catalyst components in either a stepwise or a simultaneous manner, sometimes called "in situ." The catalyst may also be "preformed" outside the polymerization system whereby all the catalyst components are mixed in the absence of the butadiene, either with or without an inert diluent and the complete blend then added to the polymerization system.

An improved preformed catalyst system can be prepared by having a small amount of a diolefin, for example butadiene or isoprene, present when the catalyst components, Me, Ni and BF₃ are mixed together. The diolefin apparently reacts with the catalyst components to form a catalyst complex which is more active, particularly when the polymerization system contains impurities, than either the in situ catalyst (which is prepared in the presence of a very large amount of monomer) or the simple preformed catalyst prepared in the absence of the diolefin. The improved preformed catalyst may be prepared by dissolving a small amount of diolefin in a hydrocarbon solvent such as benzene or hexane, and then adding the Me component, the Ni component and then the BF₃·complex component to the solvent.

The particular order of addition may be varied somewhat but it is advantageous to have (1) the diolefin present before the addition of both Me and Ni component and (2) the Ni component present before the addition of both Me and BF₃·complex catalyst components. The amount of the diolefin which can be present to form the improved preformed catalyst can be varied over a wide range, and of course, is somewhat dependent on the other catalyst concentrations. However, the amount of diolefin, preferably butadiene, used to prepare the preformed catalyst should be between about 0.001 and 3.% of the total amount of monomer to be polymerized. Based upon catalyst mole ratios, the diolefin to the Ni mole ratio should be between about 0.5/1 and 1000/1, and preferably between about 2/1 and 100/1.

The concentration of the total catalyst system employed depends on factors such as purity of the system, polymerization rate desired, temperature and other factors therefore, specific concentrations cannot be set forth except to say that catalytic amounts are used. Some specific concentrations and ratios which produce elastomers having desirable properties will be illustrated in the examples given herein to explain the teachings of this invention.

In general, the polymerizations of this invention are carried out in any inert solvent, and thus, are solution polymerizations. By the term "inert solvent" is meant that the solvent or diluent does not enter into the structure of the resulting polymer nor does it adversely affect the properties of the resulting polymer nor does it have any adverse effect on the activity of the catalyst employed. Such solvents are usually aliphatic, aromatic, cycloaliphatic hydrocarbons and ethers, representative of which are pentane, hexane, heptane, toluene, benzene, cyclohexane, diisopropyl ether and the like. Preferred solvents are hexane and benzene. The solvent/monomer volume ratio may be varied over a wide range. Up to 20 or more to 1 volume ratio of solvent to monomer can be employed. It is usually preferred or more convenient to use a solvent/monomer volume ratio of about 3/1 to about 6/1. Suspension polymerization may be carried out by using a solvent, such as butane or pentane, in which the polymer formed is insoluble. It should be understood, however, that it is not intended to exclude bulk polymerizations from the scope of this application. The polymerization may be continuous or batch type.

It is usually desirable to conduct the polymerizations of this invention employing air-free and moisture-free techniques.

The temperatures employed in the practice of this invention have not been found to be critical and may vary from a low temperature such as $-10°$ C. or below up to high temperatures of $100°$ C. or higher. However, a more desirable temperature range is between about $30°$ C. and about $90°$ C. Ambient pressures are usually used but higher or lower pressures may be employed.

The practice of this invention is further illustrated by reference to the following examples which are intended to be representative rather than restrictive of the scope of this invention.

EXAMPLE I

A purified butadiene in benzene solution containing 10 grams of butadiene per hundred milliliters of solution was charged to a number of 4-ounce bottles. Nitrogen was flushed over the surface of this premix while the catalyst was charged in the amounts shown in the table below. The catalyst employed was a mixture of triethylaluminum (TEAL), nickel octanoate (Ni salt or Ni oct) and boron trifluoride·2phenol complex, and was charged by the in situ method. The bottles were tumbled end over end for one hour in a water bath maintained at $50°$ C. The polymerizations were deactivated by the addition to the system of an amine-type stopping agent and an antioxidant, both components being added as one part per hundred parts of original monomer charged.

The results are shown in Table I. Dilute solution viscosity is shown as DSV. DSV is a measure of molecular weight of the polymer.

TABLE I

[Benzene solvent, $50°$ C.; Polymerization time, 1 hour]

| Exp. No.: | Millimole/10.0 gm. BD | | | Yield, wt. percent | DSV |
|---|---|---|---|---|---|
| | TEAL | Ni salt | BF$_3$·2 phenol | | |
| 1 | 0.06 | 0.001 | 0.079 | 49 | 2.96 |
| 2 | 0.06 | 0.0025 | 0.0775 | 70 | 2.88 |
| 3 | 0.06 | 0.005 | 0.075 | 82 | 2.79 |
| 4 | 0.06 | 0.0075 | 0.0725 | 76 | 2.49 |
| 5 | 0.06 | 0.010 | 0.070 | 68 | 2.37 |

The data in the above table indicate that a variation in the concentration of the Ni salt (nickel octanoate) catalyst component has only little effect on the dilute solution viscosity of the formed polybutadiene. The total catalyst concentration remained constant.

EXAMPLE II

Butadiene was polymerized in a manner similar to that of Example I using the same catalyst components and procedures, except that heptane rather than benzene was used as the inert organic diluent. The results are shown in Table II below.

TABLE II

[Heptane solvent, $50°$ C.; Polymerization time, 1 hour]

| Exp. No.: | Millimole/10.0 gm. BD | | | Yield, wt. percent | DSV |
|---|---|---|---|---|---|
| | TEAL | Ni salt | BF$_3$·2 phenol | | |
| 1 | 0.06 | 0.001 | 0.075 | 35 | 3.52 |
| 2 | 0.06 | 0.0025 | 0.0775 | 78 | 3.54 |
| 3 | 0.06 | 0.005 | 0.075 | 85 | 3.62 |
| 4 | 0.06 | 0.010 | 0.070 | 79 | 3.53 |
| 5 | 0.06 | 0.020 | 0.060 | 70 | 3.19 |
| 6 | 0.06 | 0.030 | 0.050 | 42 | 3.02 |

EXAMPLE III

Butadiene was polymerized in a manner similar to that of Example II using the same catalyst components and procedures except that the amounts of the catalyst components were varied. In Experiments 4, 5 and 6 below, the total catalyst quantities were approximately double the quantities used in Experiments 1, 2 and 3 below, as well as in all of the experiments in Examples I and II above. Table III below indicates that all of the variations in the catalyst ratios have not affected significantly the micro-structure of the polybutadiene formed. In all experiments in Table III, the cis-1,4 addition content is above 96%.

TABLE III

[Heptane solvent, $50°$ C.; Polymerization time, as shown]

| Ex. No. | Millimoles/10 gm. BD | | | Polymerization time, hrs. | Yield wt. percent | DSV | IR, percent cis [1] |
|---|---|---|---|---|---|---|---|
| | TEAL | Ni salt | BF$_3$·2 phenol | | | | |
| 1 | 0.02 | 0.0025 | 0.117 | 18 | 28 | ------ | 96.5 |
| 2 | 0.06 | 0.005 | 0.075 | 0.5 | 73 | 3.61 | 97.6 |
| 3 | 0.095 | 0.005 | 0.40 | 18 | 45 | 6.46 | 97.8 |
| 4 | 0.15 | 0.001 | 0.129 | 1 | 29 | ------ | 97.1 |
| 5 | 0.06 | 0.005 | 0.215 | 1 | 84 | 2.43 | 96.1 |
| 6 | [2] 0.10 | 0.005 | 0.10 | 1 | 91 | 3.84 | 99.1 |

[1] When the cis-1,4 content is 96% or greater, the balance of the microstructure is comprised of approximately equal parts of trans-1,4-polybutadiene and 1,2-polybutadiene. However, the percent 1,2-addition is seldom greater than 2%.

[2] The organometallic compound in Experiment 6 was triisobutyl-aluminum rather than TEAL (triethylaluminum).

EXAMPLE IV

Butadiene was polymerized in a manner similar to that used in Example I using the same catalyst components, except that the catalyst components were charged at a constant ratio with respect to each component and also at constant total level in all the experiments in Table IV below. Table IV below indicates that the DSV (dilute solution viscosity) of the polybutadiene polymer remains relatively independent of the degree of conversion.

TABLE IV

[Benzene solvent, 50° C.; Polymerization time, as shown]

(Five Identically Charged Bottles)

| | Millimoles/10 gms. BD | | | | Polymerization time, hrs. | Yield, wt., percent | DSV |
|---|---|---|---|---|---|---|---|
| | TEAL | Ni salt | BF₃·2 Phenol | Total catalyst | | | |
| Ex. No. | | | | | | | |
| 1 | 0.06 | 0.005 | 0.075 | 0.140 | 0.5 | 58 | 2.65 |
| 2 | 0.06 | 0.005 | 0.075 | 0.140 | 1.0 | 82 | 2.79 |
| 3 | 0.06 | 0.005 | 0.075 | 0.140 | 2.0 | 91 | |
| 4 | 0.06 | 0.005 | 0.075 | 0.140 | 4.0 | 96.5 | |
| 5 | 0.06 | 0.005 | 0.075 | 0.140 | 18.0 | 98 | 2.63 |

EXAMPLE V

Butadiene was polymerized in a method similar to that used in Example I except that a different ratio and total quantity of catalyst components were employed. Also, the catalysts were added in both preformed and in situ addition. In both the preformed and in situ additions, the catalyst component ratios and total quantities charged were the same. By "in situ" addition is meant that the catalyst components are added separately to the main polymerization reaction vessel. Preformed addition means adding all the catalyst components together and then charging the separate active catalyst system to the main polymerization system.

TABLE V

Solvent, benzene; Temperature, 50° C.
Catalyst charge, millimoles/10 gm. BD; TEAL/Ni salt/BF₃·2 phenol .10/0.005/0.11.

| Catalyst charged | Yield, wt. percent at time in hours | | | | | DSV at 2 hrs. | percent cis-1,4 |
|---|---|---|---|---|---|---|---|
| | 0.25 hrs. | 0.50 hrs. | 1 hr. | 2 hrs. | 4 hrs. | | |
| In situ addition | | 66 | 77 | 87 | 91 | 2.71 | 96.8 |
| Preformed | 57 | 72 | 83 | 90 | 91 | 2.96 | 96.8 |

Table V indicates that a preformed catalyst system promotes an earlier and a faster reaction rate.

EXAMPLE VI

Butadiene was polymerized using a procedure similar to the procedure used in Example I except for the following:
(1) All catalyst ratios and quantities were held constant.
(2) Tri-normal-propyl aluminum (TNPA) replaced triethyl aluminum (TEAL) in one series of experiments.
(3) The order of catalyst component addition was varied.
(4) BF₃·EtOH was used as the boron trifluoride complex rather than BF₃·2 phenol. Two different orders of addition were tried with two different R₃Al compounds as follows:
  (A) Charging order:

R₃Al+Ni octanoate+BF₃·EtOH (B) Charging order:

Ni octanoate+BF₃·EtOH+R₃Al

Table VI below shows the effects of the two different orders of catalyst component additions.

TABLE VI

Solvent, benzene; Temperature, 50° C.; In situ system.
Catalyst ratios and quantities: R₃Al/Ni salt/BF₃EtOH= 0.06/0.005/0.075 millimole /10 gms. BD.

| | Charging order | Yield, wt. percent at time in hrs. | | | | |
|---|---|---|---|---|---|---|
| | | 0.5 | 1 | 2 | 4 | 18 |
| R₃Al component: | | | | | | |
| TEAL 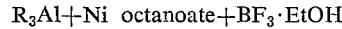 | A | | 53 | 77 | 87 | 88 |
| TEAL  | B | | 7 | 42 | 67 | 77 |
| TNPA | A | 27 | 48 | 67 | 83 | 87 |
| TNPA | B | | 15 | 26 | 51 | 82 |

Table VI indicates that the order of charging the catalyst components has an effect on the early reaction rate of the polymerization system. Table VI indicates that in situ addition Order "A" promotes both an earlier reaction (a very short induction period), and a faster reaction rate.

EXAMPLE VII

Butadiene was polymerized using a procedure similar to the procedure used in Example I except that various BF₃·alcohol complexes were used in addition to BF₃·2 phenol. Catalyst components and catalyst concentrations are shown in Table VIIa below. Results are given in Table VIIb.

TABLE VIIa

[Solvent, benzene; Polymerization temperature, 50° C.]

| | Millimoles/10 gm. BD | | | R₃ charged | BF₃ complex charged |
|---|---|---|---|---|---|
| | R₃Al | Ni Octanoate | BF₃· complex | | |
| Exp. No.: | | | | | |
| 1 | 0.06 | 0.005 | 0.075 | TEAL | ·2 MeOH |
| 2 | 0.06 | 0.005 | 0.075 | TEAL | ·MeOH |
| 3 | 0.06 | 0.005 | 0.075 | TEAL | ·EtOH |
| 4 | 0.06 | 0.005 | 0.075 | TEAL | ·BuOH |
| 5 | 0.06 | 0.005 | 0.075 | TEAL | ·2 phenol |
| 6 | 0.06 | 0.005 | 0.075 | TEAL | ·2 phenol |
| 7 | 0.06 | 0.005 | 0.075 | TEAL | ·p-cresol |
| 8 | 0.04 | 0.005 | 0.040 | TNPA | ·EtOH |
| 9 | 0.10 | 0.0075 | 0.140 | TNPA | ·MeOH |

TABLE VIIb

| | Yield, wt. percent at time in hours | | | | DSV | Percent cis-1,4 |
|---|---|---|---|---|---|---|
| | 1 | 2 | 4 | 19 | | |
| Exp. No.: | | | | | | |
| 1 | 39 | 60 | 77 | 86 | 2.68 | 97.1 |
| 2 | 42 | 71 | | 88 | 2.39 | 96.6 |
| 3 | 54 | 77 | 87 | 88 | 2.84 | 97.2 |
| 4 | 69 | 86 | | 95 | 2.76 | 98.0 |
| 5 | 79 | 94 | 100 | | 2.80 | |
| 6 | 72 | 86 | 89 | 87 | 2.60 | 97.2 |
| 7 | 25 | 71 | 78 | 87 | 3.34 | 97.6 |
| 8 | 29 | 58 | 82 | 89 | 2.57 | |
| 9 | 35 | 83 | 85 | 92 | 1.22 | |

EXAMPLE VIII

Butadiene was polymerized using a procedure similar to the procedure used in Example I except that various BF₃·complexes of hydrates and mineral acids were employed as one catalyst component. TNPA (tri-normal propyl aluminum) was used as the organoaluminum component. Table VIIIa below shows the catalysts used and the catalyst concentrations. Table VIIIb gives the polymerization results.

TABLE VIIIa

[Solvent, benzene; Temperature, 50° C.]

| | Millimoles/10 gms. BD | | | BF₃· complex used |
|---|---|---|---|---|
| | R₃, Al | Ni octanoate | BF₃· complex | |
| Exp. No.: | | | | |
| 1 | 0.060 | 0.005 | 0.075 | ·H₃PO₄ |
| 2 | 0.10 | 0.01 | 0.10 | ·2H₂O |
| 3 | 0.06 | 0.005 | 0.075 | ·H₂O |

TABLE VIIIb

| Exp. No.: | Yield, wt. percent at time in hours | | | | | DSV | percent cis |
|---|---|---|---|---|---|---|---|
| | 1 | 1.5 | 2 | 4 | 19 | | |
| 1 | 71 | | | 82 | 97 | 2.88 | 96.2 |
| 2 | | 84 | | | | 2.56 | 96.6 |
| 3 | 75 | | 81 | 91 | | 2.78 | 96.8 |

In Table VIII above the mineral acid and hydrate complexes are immiscible with the polymerization solvents. It is believed that these $BF_3$·complexes will operate more efficiently and consistently if excellent dispersion of the catalyst complex can be effected by either use of surfactants or mechanical techniques.

EXAMPLE IX

Butadiene was polymerized in a manner similar to the manner used in Example I except that a number of $BF_3$·complex types were used, and the polymerization time was 18 hours. The types of $BF_3$·complexes used and the quantities are shown in Table IX below.

TABLE IX

[Solvent, benzene; Temperature, 50° C.]

| Exp. No. | TEAL | NiOct | Complex | $BF_3$-complex used | Yield, wt. percent in 18 hrs. | DSV |
|---|---|---|---|---|---|---|
| 1 | 0.06 | 0.005 | 0.075 | ·2-acetic acid | Nil | |
| 2 | 0.06 | 0.005 | 0.075 | ·Acetic acid | 10 | Solid. |
| 3 | 0.06 | 0.005 | 0.075 | ·Butyric acid | 6 | |
| 4 | 0.06 | 0.005 | 0.075 | ·2-propylene glycol | 1 | |
| 5 | 0.06 | 0.005 | 0.075 | ·2-ethoxy-etnaonl | 20 | |
| 6 | 0.06 | 0.005 | 0.15 | ·2 propylene glycol | 3 | |
| 7 | 0.10 | 0.01 | 0.30 | ·Butyric acid | 22 | Semi-liquid. |

Table IX above indicates that many $BF_3$·complexes are not suitable and will not form a high cis-1,4-polybutadiene at ordinary polymerization conditions.

EXAMPLE X

Butadiene was polymerized using a procedure similar to the procedure used in Example I except that various alkyl aluminum and alkyl aluminum hydride compounds were used as one catalyst component, and the catalyst components were charged at a constant ratio with respect to each component and at a constant total catalyst level. Table X, below, indicates that would the exception of where $Et_2AlOEt$ (diethylethoxyaluminum) was used as the organoaluminum catalyst component, the use of various alkyl aluminum compounds results in similar polymerization rates and polymer viscosities.

TABLE X

Benzene solvent, 50° C.; Polymerization time, as shown. Catalyst concentration: Al/NiOctanoate/$BF_3$·2 phenol =0.06/0.005/0.075 millimoles/10 g. BD.

| Reducing agent | Yield: wt. percent at time in hours | | | | | DSV | Percent cis-1,4 |
|---|---|---|---|---|---|---|---|
| | 0.5 | 1 | 2 | 4 | 22 | | |
| Exp. No.: | | | | | | | |
| 1 TEAL | 63 | 78 | 84 | 90 | | 2.30 | |
| 2 TIBAL | 59 | 76 | 84 | | | 2.62 | |
| 3 DIBAL-H | 62 | 77 | 84 | 89 | | 2.47 | 97.1 |
| 4 $Et_2AlOEt$ | | | | | | 3.45 | 97.7 |

Note:
TEAL=triethylaluminum.
TIBAL=triisobutylaluminum.
DIBAL-H=diisobutylaluminum hydride.
$Et_2AlOEt$=diethylethoxyaluminum.

EXAMPLE XI

Butadiene was polymerized using a procedure similar to the procedure used in Example I except that various organic salts of nickel were used.

Table XI, below, indicates that the specific organometallic compound of nickel used has an effect on the polymerization reaction rate as determined by the yield calculated at given time increments after the start of the polymerization, and the molecular weight also. The column headed "Nickel salt" indicates the particular nickel salt employed.

TABLE XI

Benzene solvent, 50° C.; Polymerization time, as shown. Catalyst concentration: TEAL/Ni salt/$BF_3$·2 phenol =0.06/0.005/0.075 millimole/10 gm. BD.

| | Nickel salt | Yield: wt. percent at time in hours | | | DSV |
|---|---|---|---|---|---|
| | | 1 | 4 | 20 | |
| Exp. No.: | | | | | |
| 1 | Octanoate | 78 | 90 | | 2.30 |
| 2 | Naphthenate | 76 | | | 2.73 |
| 3 | Acetylacetonate | 65 | | | 2.51 |
| 4 | Salicylaldehyde | 30 | 76 | | 2.66 |
| 5 | Stearate | | 15 | 43 | 3.21 |
| 6 | Acetate. $4H_2O$ | | 10 | 18 | |
| 7 | Acetate. $4H_2O$ [1] | | 33 | 53 | 3.44 |

[1] TEAL (triethylaluminum) concentration was 0.075 millimoles/10 gms. of BD in Experiment 7.

The nickel acetate used in Experiments 6 and 7 contained water of hydration and was much less active than the other nickel salts at equivalent concentrations. An increase in the TEAL catalyst component in Experiment 7 increased the overall catalyst activity to some extent but the activity was still much less than that when nickel octanoate was used.

While certain representative embodiments and details have been shown for the purpose of illustrating the invention, it will be apparent to those skilled in this art that various changes and modifications may be made therein without departing from the spirit or scope of the invention.

What is claimed is:

1. The process for the polymerization of butadiene and butadiene in mixture with other diolefins to form polymers containing a high proportion of the butadiene units in the cis-1,4 configuration comprising contacting at least one monomer from the group of butadiene and butadiene in mixture with other diolefins, under polymerization conditions, with a catalyst comprising (1) at least one organometallic compound in which the metal is selected from Groups I, II and III of the Periodic System, (2) at least one organometallic compound selected from the class consisting of nickel salts of carboxylic acids, organic complex compounds of nickel, nickel tetracarbonyl, cobalt salts of carboxylic acids, organic complex compounds of cobalt and dicobalt octacarbonyl and (3) at least one boron trifluoride complex prepared by complexing boron trifluoride with a member of the class consisting of monohydric alcohols, phenols, water and mineral acids containing oxygen.

2. The process according to claim 1 in which butadiene-1,3 alone is employed.

3. A process according to claim 1 in which the organometallic compound of metals from Groups I, II and III of the Periodic System is selected from the group consisting of organoaluminum compounds, organomagnesium compounds, organozinc compounds and organolithium compounds; and in which the organonickel compound is selected from the group consisting of nickel salts of carboxylic acids and organic complex compounds of nickel; and in which the boron trifluoride complex is selected from the group consising of $BF_3$·2 phenol, $BF_3$·100% phosphoric acid, $BF_3 \cdot$butanol, $BF_3 \cdot$ethanol and $BF_3 \cdot$hydrates.

4. The process according to claim 1 in which the mole ratio of organometallic compound with metals selected from Groups I, II and III of the Periodic System/organonickel and/or organocobalt compound ranges from about 0.3/1 to about 500/1, the mole ratio of the $BF_3 \cdot$complex/organonickel and/or organocobalt compound ranges from about 0.33/1 to about 300/1 and the mole ratio of the organometallic compound with metals selected from Groups I, II and III of the Periodic System/$BF_3 \cdot$complex ranges from about 0.1/1 to about 4/1.

5. The process according to claim 4 in which the mole ratio of the organometallic compounds with metals selected from Groups I, II and III of the Periodic System/organonickel and/or organocobalt compound ranges from about 1/1 to about 150/1; the preferred mole ratio of the $BF_3 \cdot$complex/organonickel and/or organocobalt compound ranges from about 1/1 to about 150/1; and the preferred mole ratio of the organometallic compound with metals selected from Groups I, II and III of the Periodic System/$BF_3 \cdot$complex ranges from about 0.3/1 to about 1.4/1.

6. The process according to claim 4 in which the catalyst is preformed in the presence of a small amount of the diolefin to be polymerized by adding to the diolefin (1) at least one organometallic compound in which the metal is selected from Groups I, II and III of the Periodic System and (2) at least one organometallic compound selected from the class consisting of organonickel and organocobalt compounds and subsequently adding (3) at least one boron trifluoride complex prepared by complexing boron trifluoride with a member of the class consisting of monohydric alcohols, phenols, water and mineral acids containing oxygen, the mole ratio of the diolefin to the organonickel and/or organocobalt compound being between about 0.5/1 and 1000/1.

7. The process according to claim 3 in which the organometallic compounds with metals selected from Groups I, II and III of the Periodic System is an organoaluminum compound.

8. The process according to claim 7 in which the organoaluminum compound is selected from the group consisting of an aluminum trialkyl and a dialkylaluminum hydride.

9. A catalyst composition comprising (1) at least one organometallic compound in which the metal is selected from Groups I, II and III of the Periodic System, (2) at least one organometallic compound selected from the class consisting of nickel salts of carboxylic acids, organic complex compounds of nickel, nickel tetracarbonyl, cobalt salts of carboxylic acids, organic complex compounds of cobalt and dicobalt octacarbonyl and (3) at least one boron trifluoride complex prepared by complexing boron trifluoride with a member of the class consisting of monohydric alcohols, mineral acids containing oxygen, phenols and water.

10. The composition according to claim 9 in which the mole ratio of the organometallic compound with metals selected from Groups I, II and III of the Periodic System/organonickel and/or organocobalt compound ranges from about 0.3/1 to about 500/1, the mole ratio of the $BF_3 \cdot$complex/organonickel and/or organocobalt compound ranges from about 0.33/1 to about 300/1 and the mole ratio of the organometallic compound with metals selected from Groups I, II and III of the Periodic System/$BF_3 \cdot$complex ranges from about 0.1/1 to about 4/1.

References Cited

UNITED STATES PATENTS

| | | | |
|---|---|---|---|
| 2,977,349 | 3/1961 | Brockway et al. | 260—94.3 |
| 3,170,905 | 2/1965 | Ueda et al. | 260—94.3 |
| 3,170,907 | 2/1965 | Ueda et al. | 260—94.3 |
| 3,219,650 | 11/1965 | Hill | 260—94.3 |
| 3,458,488 | 7/1969 | Duck et al. | 260—82.1 |
| 3,471,462 | 10/1969 | Matsumoto et al. | 260—94.3 |

FOREIGN PATENTS 662,850  5/1963  Canada.

JOSEPH L. SCHOFER, Primary Examiner

R. A. GAITHER, Assistant Examiner

U.S. Cl. X.R.

252—431; 260—82.1

PO-1050
(5/69)

UNITED STATES PATENT OFFICE
CERTIFICATE OF CORRECTION

Patent No. 3,528,957      Dated September 15, 1970

Inventor(s) Morford C. Throckmorton and William M. Saltman

It is certified that error appears in the above-identified patent and that said Letters Patent are hereby corrected as shown below:

Column 1, line 49, "properties" is misspelled.

Column 2, line 44, between "appears" and "be" insert -- to --.

Column 8, Table II, Ex. 1, under heading "$BF_3 \cdot 2$ phenol", "0.075" should read -- 0.079 --.

Column 8, Table III, Ex. 3, under heading "$BF_3 \cdot 2$ phenol", "0.40" should read -- 0.040 --.

Column 10, Table VIIa, the heading "$R_3$ charged" should read -- $R_3Al$ charged --.

Column 10, Table VIIa, the heading "$BF_3$ com- charged" should read -- $BF_3$ complex charged --.

Column 11, Table IX, under heading entitled "$BF_3 \cdot$complex used", Ex. 5, "ethanol" is misspelled.

Column 11, line 46, "would" should read -- with --.

Column 11, Table X, under heading "22" of Ex. 4, -- 57 -- has been omitted and should be inserted.

SIGNED AND
SEALED

FEB 23 1971

(SEAL)
Attest:

Edward M. Fletcher, Jr.
Attesting Officer

WILLIAM E. SCHUYLER, JR.
Commissioner of Patents